3,221,072
TRANSALKYLATION OF AROMATIC HYDRO-
CARBONS WITH A HETEROPOLY ACID
CATALYST
Walter R. Knox and Roland Libers, St. Louis, Mo.,
assignors to Monsanto Company, a corporation of
Delaware
No Drawing. Filed Dec. 27, 1961, Ser. No. 162,550
13 Claims. (Cl. 260—672)

The present invention relates to the catalytic conversion of hydrocarbons. More particularly, the present invention relates to a process for the catalytic transalkylation of aromatic hydrocarbons.

Transalkylation is a rather specific hydrocarbon conversion. It involves the dealkylation of one alkyl aromatic hydrocarbon molecule and alkylation of another, and different, aromatic hydrocarbon molecule. Thus by transalkylation, two different aromatic hydrocarbons may each be converted to a third and different aromatic hydrocarbon. For example, transalkylation of a mixture of trimethylbenzene and toluene will produce primarily xylenes. The xylenes so produced are the result of the removal of a methyl group from trimethylbenzene and the addition of the methyl group from the trimethylbenzene to the toluene.

It is an object of the present invention to provide a novel process for the transalkylation of aromatic hydrocarbons. Another and more particular object of the present invention is to provide a novel process for the catalytic transalkylation of aromatic hydrocarbons wherein the catalyst is one containing a heteropoly acid. Additional objects of the present invention will become apparent from the following description of the invention herein disclosed.

In fulfillment of these and other objects, it has been found that when a mixture of at least two different aromatic hydrocarbons, at least one of which is an alkyl aromatic hydrocarbon of 1 to 8 alkyl carbon atoms, is passed into contact with a catalyst comprised of a heteropoly acid on support selected from the group consisting of silica-alumina and alumina at a temperature of 265 to 350° C., a pressure of 100 to 400 p.s.i.g. and a space velocity of 0.5 to 4.0 liquid volumes of feed per hour per volume of catalyst, there is produced a significant amount of aromatic hydrocarbons having molecular weights intermediate between those in the feed mixture, without significant loss in weight of the total aromatic fraction.

In order to further describe and illustrate the present invention, the following example is presented. This example is not to be construed in any manner as limiting to the present invention.

Example

A hydrocarbon mixture containing 53.5 weight percent toluene and 46.5 weight percent 1,2,4-trimethylbenzene was introduced into contact with a catalyst comprised of 20 weight percent silico-tungstic acid, 70 weight percent silica and 10 weight percent alumina under the conditions and with the results set forth below.

Conditions:
Temperature, ° C. _____ 357
Pressure, p.s.i.g. _____ 200
Space velocity, LHSV _____ 1.5

Yields, wt. percent:
Xylenes _____ 27.5
Toluene _____ 41.0
Trimethylbenzenes _____ 25.9
Tetremethylbenzenes _____ 4.0
Benzene _____ 1.6

The present invention is further demonstrated by passing the hydrocarbon mixture described above into contact with a catalyst comprised of approximately 20 weight percent phosphotungstic acid, 70 weight percent silica and 10 weight percent alumina at substantially the same conditions as set out in the above example. The yield of xylenes is approximately 30 weight percent.

The catalysts which are used in the present process are comprised of a heteropoly acid deposited on a silica-alumina or alumina support. The composition of the silica-alumina support may vary over a rather considerable range, but will preferably have a composition of 5 to 90 weight percent silica and 10 to 95 weight percent alumina. A somewhat more preferable composition for the support is one having 90 to 75 weight percent silica and 10 to 25 weight percent alumina. Both the silica-alumina and the alumina supports preferably should have a surface area of 50 to 500 square meters per gram.

The heteropoly acids are complex inorganic substances of high molecular weight in which two or more different acid cations or oxides of metals or metaloids are associated in an acid functional group. The molecular weight of these heteropoly acids may be as great as 3,000 or higher. The heteropoly acids are comprised essentially of nuclear cations of such metals as copper, thorium, tin, cerium, cobalt, zirconium, titanium, etc., and such nonmetals as boron, silicon, phosphorous and arsenic surrounded by oxygen radicals of molybdenum, tungsten or vanadium. These heteropoly acids of the present invention have the general formula

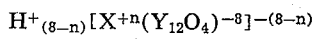

In this formula X is the central atom and is selected from the group of metals and non-metals listed above and Y is a ligand atom selected from the group consisting of molybdenum, tungsten and vanadium. The $n$ in the above formula represents a number from 3 to 5. The preferred heteropoly acids for the purposes of the present invention are those containing silicon or phosphorous as the central atom and tungsten or molybdenum as the ligand atom. Examples of such acids are $H_4(SiW_{12}O_4)$, $H_3(PW_{12}O_{40})$ and $H_3(PMo_{12}O_{40})$. The most preferred acid is silico-tungstic acid. The amount of the heteropoly acid present in the catalyst utilized in the present process may range from 5 to 50 weight percent of the total catalyst. A more preferred amount of heteropoly acid is 10 to 25 weight percent of the total catalyst.

The method whereby the catalysts of the present invention are prepared may be any of the conventional methods. A preferred, but by no means limiting, method comprises dissolving a heteropoly acid in a suitable solvent and then immersing the silica-alumina or alumina support in the acid-solvent solution and thereafter depositing the heteropoly acid onto the support by evaporation of the solvent. A specific illustration of the preparation of a heteropoly acid-silica-alumina catalyst according to this preferred method is as follows. Approximately 87 grams of a silica-alumina support crushed to 20–32 mesh was placed in a container. To this was added dropwise with constant stirring an aqueous silico-tungstic acid solution comprised of 19.5 grams of $SiO_2 \cdot 12\ WO_3 \cdot 26\ H_2O$ and 67 ml. of distilled water. This amount of acid was calculated to give a 20 weight percent concentration of heteropoly acid on the finished catalyst. The resulting heteropoly acid-support slurry was dried 12 hours at 120° C. and then heated for one hour at 280° C. Solvents which are suitable for the heteropoly acids are those which will thoroughly dissolve the acid and which can be removed from the catalyst solution without altering the properties of the catalyst. Water will often fulfill both of these requirements. Pre-calcination of the support before immersion in the acid-solvent solution is not critical to the preparation of these catalysts, but is often desirable since it aids in avoiding excess moisture. The drying temperatures of the heteropoly acid impregnated support are not particularly critical though they should not exceed approximately 400° C. Above this temperature there is a likelihood of decomposition of the heteropoly acids.

The hydrocarbon feeds which may be transalkylated according to the present invention must contain at least two different aromatic hydrocarbons selected from the groups consisting of benzene and alkylbenzenes having at least one but no greater than eight carbon atoms per alkyl chain. The alkyl benzenes may be mono-, di-, tri-, tetra-, penta- or hexa-substituted. The alkyl groups of the alkylbenzenes having more than one alkyl substituent may have equal or different numbers of carbon atoms per alkyl side chain. Several non-limiting examples of alkylbenzenes within the scope of the present invention are toluene, ethylbenzene, propylbenzene, isopropylbenzene, hexylbenzene, iso-hexylbenzenes, xylenes, diethylbenzenes, methylethylbenzenes, trimethylbenzenes, triethylbenzenes, tetramethylbenzenes, ethyl-hexylbenzenes, etc. As may be noted from these non-limiting examples, the alkyl substituents may be either straight or branched-chain. The number of different aromatics in the feed of the present invention may be virtually any number so long as there are at least two present. However, for simplicity of operation it will generally be preferred to have no more than four of the transalkylatable compounds present. Since one of the primary functions of transalkylation processes is to produce specific products from specific aromatic hydrocarbons, it is somewhat impractical to have large numbers of different transalkylatable hydrocarbons present in the feeds. When such large numbers are present, transalkylation between the many different combinations of aromatic hydrocarbons in the feed occurs and also there is further transalkylation of the products with one another and with different feed hydrocarbons. Thus, there is formed a complex polyglot mixture of benzene and alkylbenzenes which contains no large amounts of any one product and in many instances is very difficult to separate into its components. The preferred feeds of the present invention are those containing only two different aromatic hydrocarbons, each of which are selected from the group consisting of benzene and methylbenzenes, the methylbenzenes being either mono-, di-, tri-, tetra-, penta-, or hexamethyl substituted. The aromatic feed hydrocarbons must, of course, be such as will give new products by transalkylation or nothing is accomplished. For example, a mixture of benzene and mono-methylbenzene would not transalkylate to any new compound. On the other hand, a mixture of benzene and xylene would transalkylate to produce toluene. However, seldom will such feeds be found occurring in refinery and chemical plant streams. The present invention is not to be limited to any specific concentration of transalkylatable components in the feed since such is purely a matter of economics.

The temperatures at which the transalkylation reactions of the present invention may be carried out may range from 265 to 350° C. though it is somewhat more preferred that the temperatures be maintained within the range of from 310 to 340° C. Optimum temperatures, of course, will vary according to the specific catalyst and feedstock, but as such, are determinable by anyone skilled in the art having the above ranges as a guide.

Pressures at which the present invention may be operated may range from 100 to 400 p.s.i.g. It will be somewhat preferred, however, to maintain pressures within the reaction chamber at 150 to 250 p.s.i.g. The optimum pressures, as is the case of temperature, will vary somewhat with feedstocks and other reaction variables. However, they will be within the above ranges and may be readily determined by anyone skilled in the art.

Space velocities of the present process may range from approximately 0.5 to 4.0 liquid volumes of feed per hour per volume of catalyst. It is more preferable, however, that the space velocity of the reactants in the present process be within the range 1.0 to 2.0 liquid volumes of feed per hour per volume of catalyst.

The contacting of the aromatic hydrocarbons and the catalyst may be with the hydrocarbons in either the vaporous or the liquid state. The method of contact may be any of the conventionally employed methods such as fixed bed, moving bed, or fluidized bed. The benzene and/or alkylbenzene components of the feedstock may be premixed or they may be introduced separately into the reaction chamber. If introduced separately they may be introduced co-currently, counter-currently or angularly to one another. It is readily apparent that a host of adaptations and modifications in the mechanics of carrying out the present invention are possible within the spirit and scope of the present invention.

We claim:

1. A process for the transalkylation of aromatic hydrocarbons which comprises contacting a mixture of at least two different aromatic hydrocarbons each of which is selected from the group consisting of benzene and alkylbenzenes of 1 to 8 alkyl carbon atoms, with a catalyst comprised of 5 to 50 weight percent of a heteropoly acid and 95 to 50 weight percent of a support selected from the group consisting of silica-alumina having a composition of 5 to 90 weight percent silica and 95 to 10 weight percent alumina and alumina, at a temperature of 265 to 350° C., a pressure of 100 to 400 p.s.i.g. and at a space velocity of 0.5 to 4.0 liquid volumes of feed per hour per volume of catalyst 2. The process of claim 1 wherein the support has a surface area of 50 to 500 square meters per gram.

3. The process of claim 1 wherein the aromatic hydrocarbons are selected from the group consisting of benzene and methylbenzenes.

4. The process of claim 1 wherein the heteropoly acid is one containing a central atom selected from the group consisting of boron, silicon, and phosphorous and in which the ligand atom is selected from the group consisting of molybdenum, tungsten and vanadium.

5. The process of claim 1 wherein the amount of heteropoly acid present in the catalyst is 10 to 25 weight percent.

6. The process of claim 1 wherein the silica-alumina support has a composition of 90 to 75 weight percent silica and 10 to 25 weight percent alumina.

7. The process of claim 1 wherein the temperature is 310 to 340° C.

8. The process of claim 1 wherein the pressure is 150 to 250 p.s.i.g.

9. The process of claim 1 wherein the space velocity is 1.0 to 2.0 liquid volumes of feed per hour per volume of catalyst.

10. The process of claim 1 wherein the heteropoly acid is silico-tungstic acid.

11. The process of claim 1 wherein the heteropoly acid is phospho tungstic acid.

12. The process of claim 1 wherein the heteropoly acid is silico molybdic acid.

13. The process of claim 1 wherein the heteropoly acid is phospho molybdic acid.

References Cited by the Examiner

UNITED STATES PATENTS

| | | | |
|---|---|---|---|
| 2,301,966 | 11/1942 | Michel et al. | 260—671 |
| 2,547,380 | 4/1951 | Fleck | 260—683.64 X |
| 2,589,057 | 3/1952 | Corson et al. | 260—672 |
| 2,608,534 | 8/1952 | Fleck | 260—683.64 X |
| 3,126,423 | 3/1964 | Kronig et al. | 260—671 |

OTHER REFERENCES

Ephriam: "Inorganic Chemistry," N.Y., Interscience, 1949, pages 512–521.

PAUL M. COUGHLAN, *Primary Examiner.*

ALPHONSO D. SULLIVAN, *Examiner.*